E. C. GREINER.
OVEN.
APPLICATION FILED MAY 16, 1917.
1,238,663.
Patented Aug. 28, 1917.
4 SHEETS—SHEET 3.
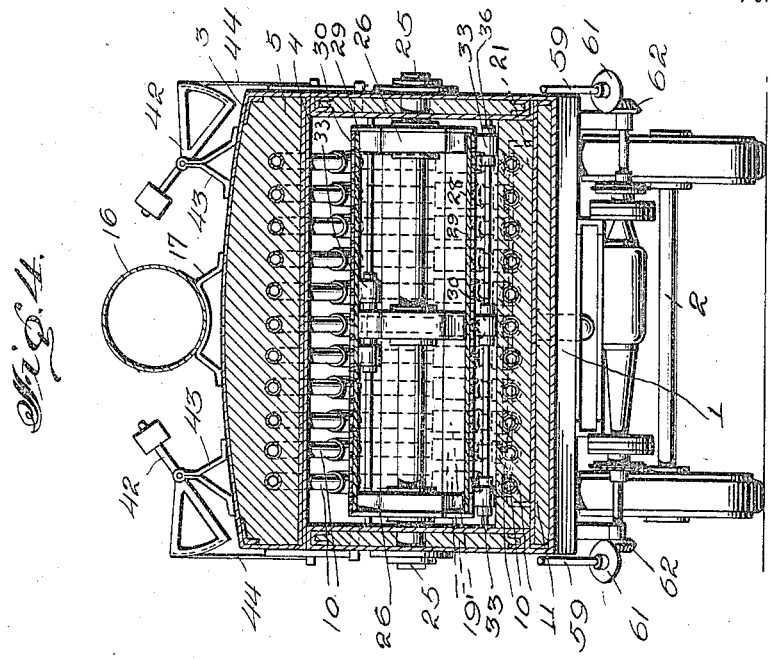
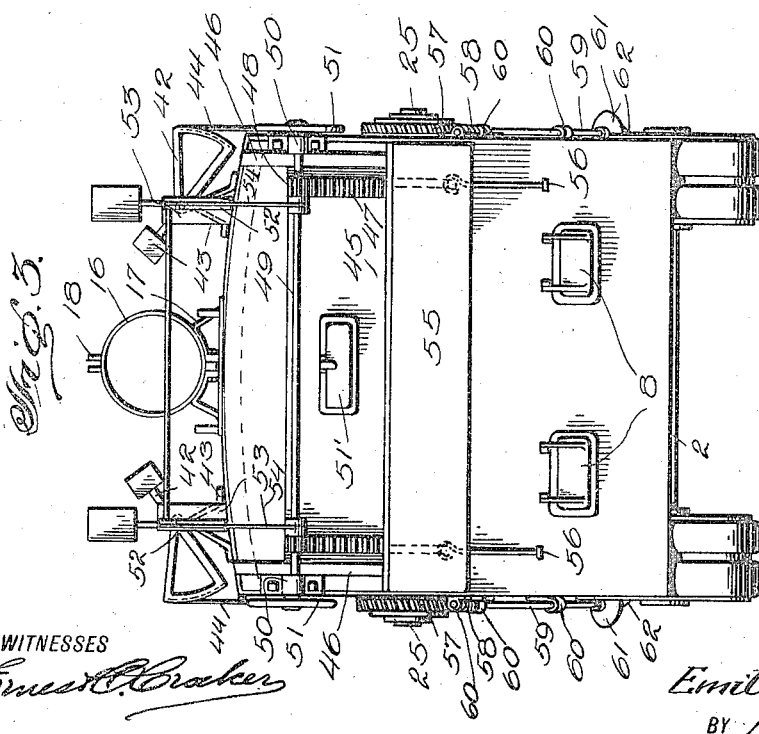
WITNESSES
INVENTOR
Emil C. Greiner
BY
ATTORNEYS E. C. GREINER.
OVEN.
APPLICATION FILED MAY 16, 1917.
1,238,663.
Patented Aug. 28, 1917.
4 SHEETS—SHEET 4.
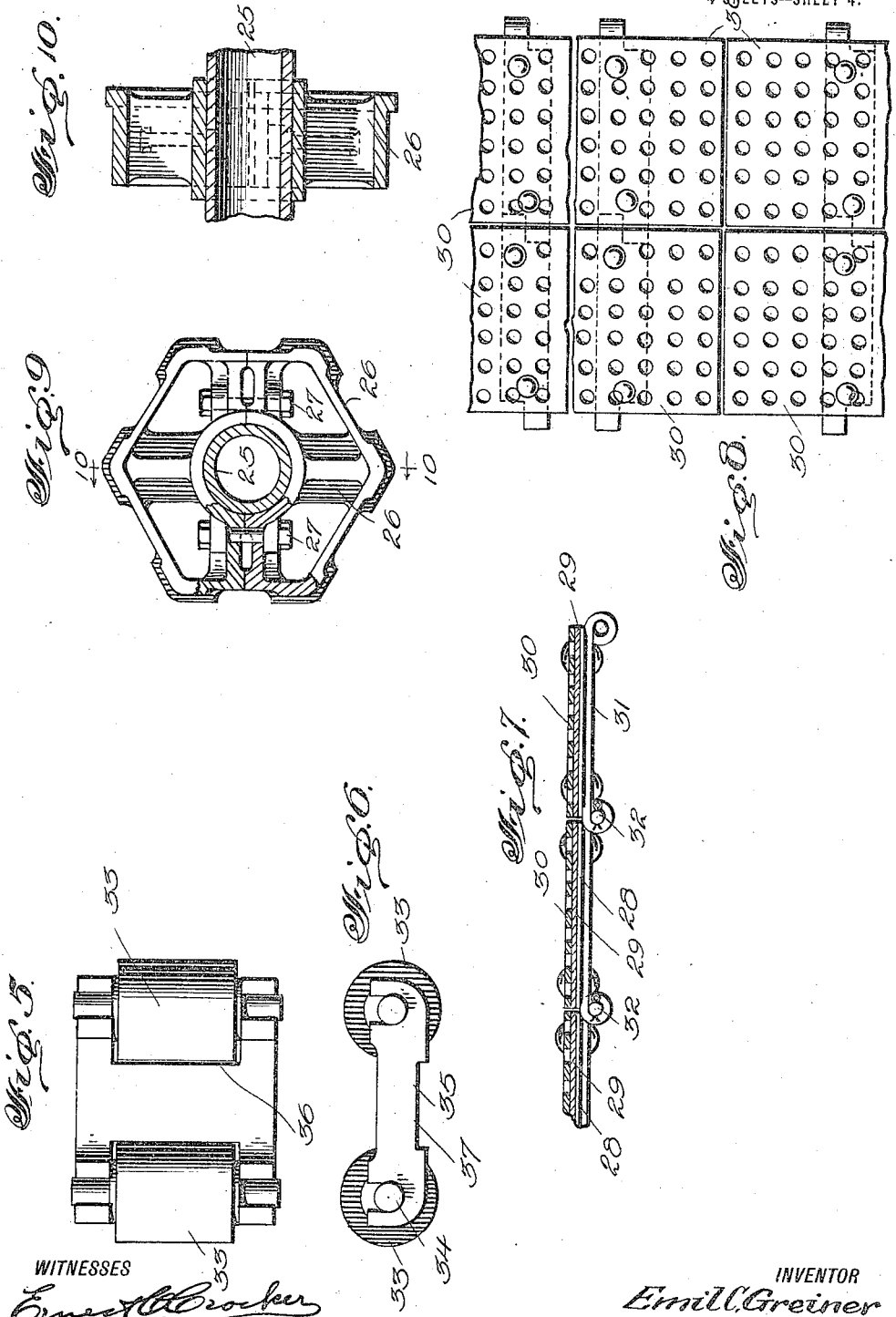
WITNESSES
INVENTOR
Emil C. Greiner
BY
ATTORNEYS

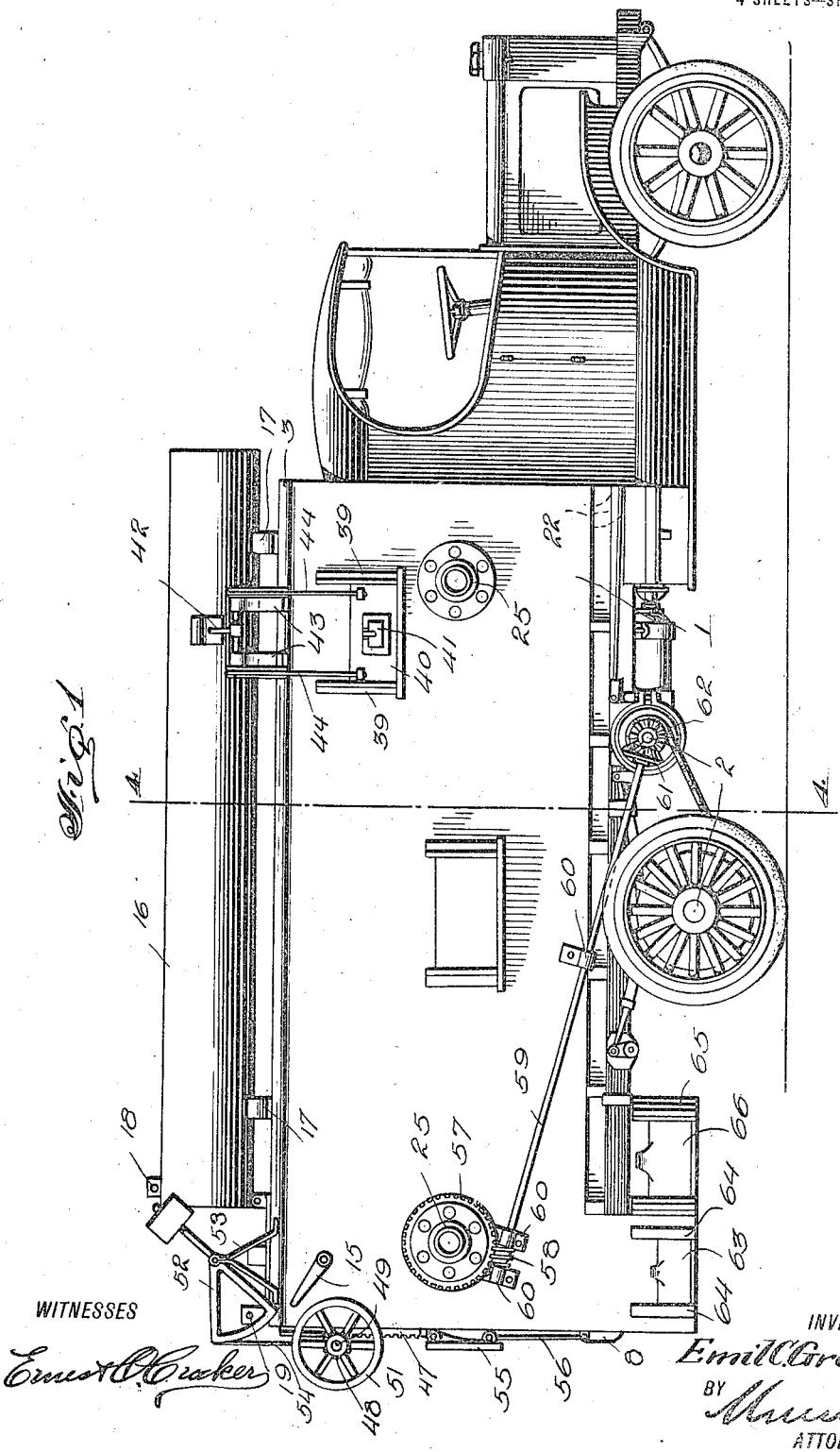

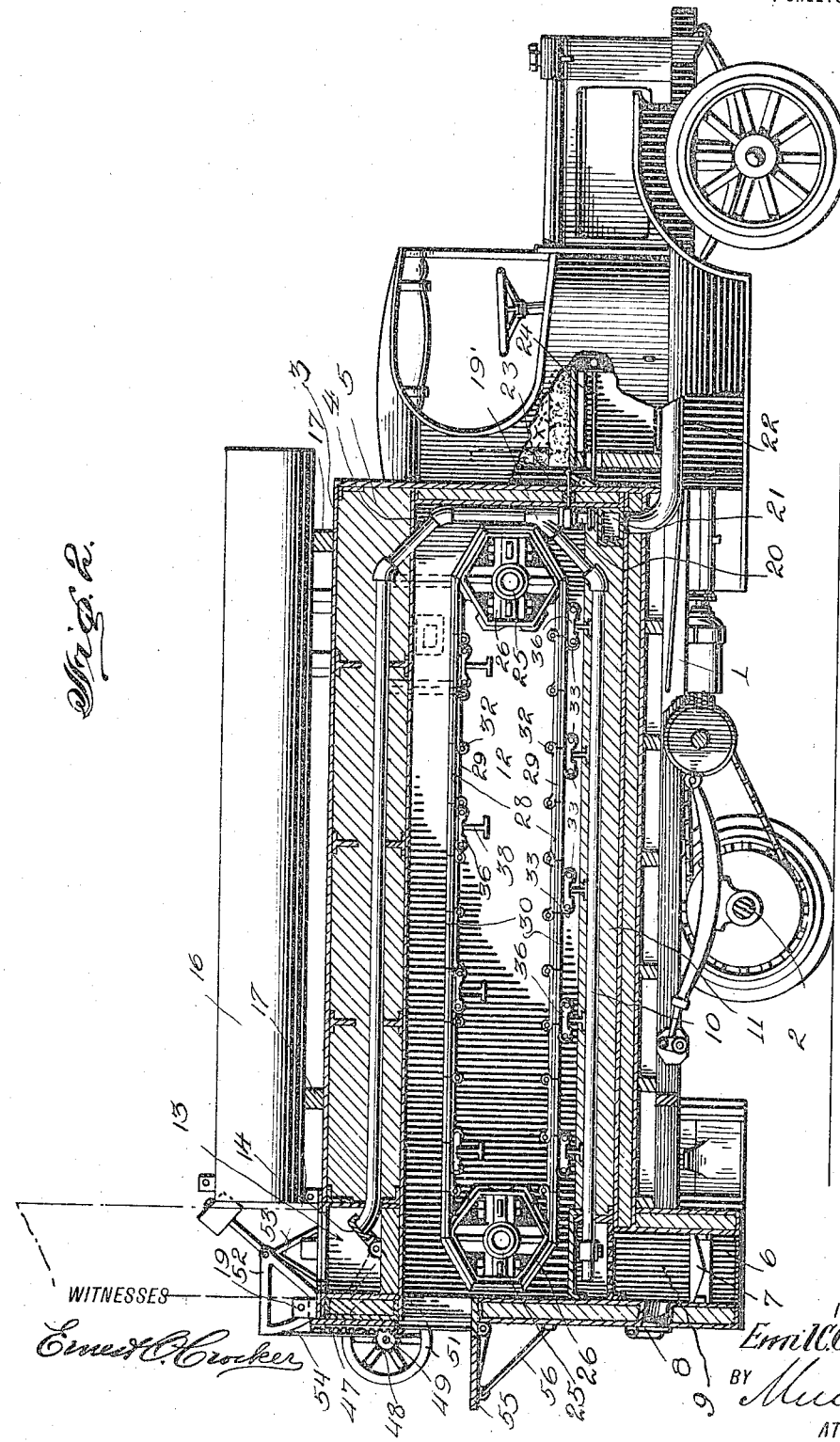

UNITED STATES PATENT OFFICE.

EMIL CHRISTIAN GREINER, OF GLOBE, ARIZONA.

OVEN.

1,238,663.  Specification of Letters Patent.  Patented Aug. 28, 1917.

Application filed May 16, 1917. Serial No. 168,970.

*To all whom it may concern:*

Be it known that I, EMIL CHRISTIAN GREINER, a citizen of the United States, and a resident of Globe, in the county of Gila and State of Arizona, have invented new and useful Improvements in Ovens, of which the following is a specification.

My invention is an improvement in ovens, and has for its object to provide a device of the character specified, especially adapted for military use, wherein the oven is mounted on a motor, and wherein the exhaust of the motor is utilized for assisting the heating of the oven, and wherein the power plant of the motor is utilized to drive the carrier of the oven.

In the drawings:

Figure 1 is a side view of the improved oven;

Fig. 2 is a longitudinal vertical section;

Fig. 3 is a rear end view;

Fig. 4 is a section on the line 4—4 of Fig. 1;

Fig. 5 is a top plan view of a set of supporting rollers for the carrier;

Fig. 6 is a side view of Fig. 5;

Fig. 7 is a detail section of a portion of the carrier;

Fig. 8 is a top plan view of a portion of the carrier;

Fig. 9 is an end view of one of the supporting rollers for the carrier, with parts in section; and Fig. 10 is a section on the line 10—10 of Fig. 9.

The present embodiment of the invention comprises an oven casing, which is mounted upon the frame 1 of a motor vehicle, the said motor vehicle having the usual driving shaft 2 driven by the usual motor, and this motor is connected with the endless carrier, to be later described, for driving the same to cause the articles to be baked to be fed through the oven. The oven casing, which is substantially rectangular in cross section, is composed of spaced outer and inner walls 3 and 4, and the space between the walls is filled with ashes, which are tamped between the walls to form a filling 5. The fire box 6 is at the rear of the casing, and depends at the rear of the frame, said fire box having the usual grate 7 and feed openings normally closed by doors 8.

A chamber or casing 9 is provided above the fire box, the lower wall of the said casing forming the top for the fire box and being perforated to permit the heated air to pass into the chamber, and the heat conducting pipes 10 extend from this chamber forwardly within a suitable lining 11 of heat-resisting material to the front of the baking chamber 12. Here these pipes extend upwardly into the chamber, and through the upper inner wall 4 into the jacket between the upper walls. The tubes are then continued rearwardly, where they open into a smoke chamber 13 which is arranged directly above the combustion chamber. As shown, the ends of the tubes 10 are curved upwardly within the smoke chamber, and valves 14 are provided for closing the said ends, the valves being secured to a common operating arm 15 outside of the casing, by means of which the valves or dampers may be simultaneously opened and closed.

A smoke stack 16 is hinged to the oven casing at the smoke chamber, and the said smoke stack is adapted to rest in cradles 17 on the top of the casing, as shown in Figs. 1 and 2, or be lifted into vertical position over the opening of the smoke chamber, to carry off the smoke, and to make a draft. When so lifted the smoke stack may be secured in vertical position, by means of perforated lugs 18 on the stack, which are adapted to fit around a perforated lug 19 on the oven, the perforations being adapted to receive a bolt or pin to hold the stack vertical. Just after the tubes 10 issue from the lining of refractory material indicated at 11, each tube has a T 19′ interposed in the length thereof, and each of these T's is connected by a pipe 20 with a casing 21 extending transversely of the oven in the refractory lining 11, said casing being adapted to receive the exhaust from the engine through the exhaust pipe 22. Valves 23 are provided for closing these pipes when desired, and the said valves are adapted to be operated by a sliding link 24 beneath the driver's seat, the said link extending forwardly into position to be easily grasped by the driver. The valves are connected to the link in such manner that when the link is pulled forwardly the valves will be closed.

An endless conveyer is arranged within the oven chamber 12, the said conveyer being supported by hollow shafts 25 journaled transversely of the chamber at the ends thereof, and supporting wheels are secured to the shafts, the said wheels being hexagonal as shown in Fig. 9. Each of these wheels 26 consists of two sections, which may be clamped on the hub by means of bolts and nuts 27, and the wheels are near the ends of the shafts and intermediate the ends of the shafts, as shown in Fig. 4. The endless conveyer comprises series of transverse rows of plates 28, each having upon the upper face thereof a layer of asbestos 29, and above the layer of asbestos a perforated plate 30, the said plates 28, 29 and 30 being secured together by means of rivets. At their under sides the plates have secured thereto links 31, and these links extend beyond the plates, as shown, and are pivotally connected to the links of adjacent plates, as indicated at 32, to form an endless belt which is supported by the wheels 26.

The articles to be baked are laid upon the perforated plates, and the upper and lower runs of the carrier are supported by sets of rollers 33, which have trunnions 34 journaled in open bearings in plates 35. These plates have their ends notched, as shown at 36, and the bearings are at the ends of the notches. The rollers extend above and below the plates, and each plate has a transverse recess 37 on its under side, which receives the top of an eye bar 38, the said eye bars being arranged transversely of the oven chamber below the upper and lower runs of the carrier. Thus the endless belt moves on the rollers, and the upper run of the belt is supported in a fixed plane. The articles to be baked are fed into the oven through side door openings at the front of the chamber and at opposite sides thereof, the said door openings having guides 39 at their sides, in which moves a door 40. This door has a peep opening normally closed by a door 41, and each door is operated by a counterweighted lever 42 pivoted to a bracket 43 on the top of the oven, and connected to the door by means of flexible members 44. The outer end of each lever is arc shaped, as shown, and it will be evident that when the inner ends are pushed downwardly the feed doors will be opened.

The baked bread is delivered at the rear of the oven through a door opening which is normally closed by a door 45. This door is movable vertically in guides 46, and the said door has rack bars 47 at its ends, which move in engagement with pinions 48 on a shaft 49 journaled in bearings 50 at the rear of the oven casing, the shaft having hand wheels 51 for convenience in turning the same. This door 45 has a peep hole normally closed by a door 51, and counterweights are connected with the door to balance the same during the raising and lowering of the door. These counter-weights are on levers 52 which are pivoted on brackets 53 on the casing and the arc shaped outer ends of the levers are connected to the door by flexible members 54.

A shelf 55 is hinged to the oven casing just below the door 45, and this shelf may be held in horizontal position by means of braces 56, which may swing downwardly in the manner shown in Fig. 3.

The rear shaft 25 has its ends extended, and the said ends have secured thereto worm wheels 57. These worm wheels are engaged by worms 58 on shafts 59, which are journaled in bearings 60 on the outer casing wall. Each shaft extends forwardly and downwardly, and at its forward end each shaft has a beveled gear 61, which meshes with a similar gear 62 on the driving shaft 2, before mentioned.

Ashes may be removed from the fire box through a door opening which is normally closed by a vertically sliding door 63, the said door moving in guides 64. A receptacle 65 for tools or the like is arranged in front of the fire box, the said receptacle having an end door 66 similar to the door 63.

In operation, the bread to be baked is placed on the conveyer through the feed doors 40 and is moved gradually rearwardly, eventually arriving at the door opening at the rear, baked and ready for use. The heated air from the chamber 9 passes forwardly through the tubes 10, which are, in the present instance, eleven in number, and which pass through the baking chamber at the front. Thus the chamber is uniformly heated, the tubes, at the point where they pass through the chamber, guiding the excess heat necessary to heat the said end uniformly with the rear end, which is heated in part directly by the fire box. The exhaust may be utilized to assist in heating by opening the valves 22.

I claim:

1. In combination with a motor vehicle, of an oven casing mounted on the vehicle, an endless conveyer mounted in the casing, a driving connection between the motor and the carrier for moving the upper run of the carrier rearwardly, said oven casing having feed doors at the front and delivery doors at the rear, said oven having a fire box at the bottom of its rear end and a smoke chamber at the top of said end, a heat chamber above the fire box and having a perforate bottom, a series of heat conducting tubes of approximately U-shape, each comprising a body and arms, one arm of each tube being connected with the heat chamber and the other arm extending into the smoke chamber, a valve for the said arm of each pipe for closing the end thereof, and a common means for operating the valves, an exhaust chamber at the front of the oven and communicating with the exhaust of the motor, each heat conducting pipe having a branch communicating with the exhaust chamber and valves for closing the said branch pipes.

2. In combination with a motor vehicle, of an oven casing mounted thereon, a series of heat conducting tubes arranged within the casing, each comprising a body extending vertically at the front of the casing and arms extending longitudinally of the casing above and below the baking chamber, a fire box with which the lower arms of the tubes are connected, a smoke box with which the upper arms are connected, a valve in connection with each pipe at the smoke box for closing the same, and a connection between the heat conducting tubes and the exhaust of the motor.

3. In combination with a motor vehicle, of an oven casing mounted thereon, a series of heat conducting tubes arranged within the casing, each comprising a body extending vertically at the front of the casing and arms extending longitudinally of the casing above and below the baking chamber, a fire box with which the lower arms of the tubes are connected, and a smoke box with which the upper arms are connected, an exhaust casing with which the exhaust of the motor communicates, each conducting tube having a branch leading to the exhaust pipe, and valves for closing the said pipes.

4. In combination with a motor vehicle, of an oven casing mounted thereon, a series of heat conducting tubes arranged within the casing, each comprising a body extending vertically at the front of the casing and arms extending longitudinally of the casing above and below the baking chamber, a fire box with which the lower arms of the tubes are connected, a smoke box with which the upper arms are connected, and means for connecting the exhaust of the motor to the heat conducting tubes.

EMIL CHRISTIAN GREINER.

Copies of this patent may be obtained for five cents each, by addressing the "Commissioner of Patents, Washington, D. C."